(12) United States Patent  (10) Patent No.: US 8,733,254 B1
Wakefield  (45) Date of Patent: May 27, 2014

(54) PLANTER TABLE SYSTEM

(76) Inventor: Teresa Lynn Wakefield, Highland Village, TX (US)

( * ) Notice: Subject to any disclaimer, the term of this patent is extended or adjusted under 35 U.S.C. 154(b) by 0 days.

(21) Appl. No.: 13/619,985

(22) Filed: Sep. 14, 2012

(51) Int. Cl.
*A47B 37/00* (2006.01)

(52) U.S. Cl.
USPC ........................................ 108/50.11

(58) Field of Classification Search
USPC ............... 108/25, 26, 50.11, 59, 92, 93, 101
See application file for complete search history.

(56) References Cited

U.S. PATENT DOCUMENTS

| | | | | |
|---|---|---|---|---|
| 1,928,799 A | * | 10/1933 | Stevens | 47/39 |
| 1,935,682 A | * | 11/1933 | Wege | 108/150 |
| 4,905,612 A | * | 3/1990 | Apissomian | 108/157.15 |
| 6,467,843 B1 | * | 10/2002 | Rossborough | 297/344.18 |
| 6,665,980 B2 | * | 12/2003 | Laske, Jr. | 47/39 |
| 7,155,860 B1 | | 1/2007 | Ferguson, III | |
| 2004/0040476 A1 | * | 3/2004 | Diers | 108/26 |
| 2006/0118011 A1 | | 6/2006 | Caeton | |

OTHER PUBLICATIONS

Accent Tables, 580 Glass Round Side Table, website: www.glasstopsdirect.com/accent-table0580.php, printed Sep. 13, 2012, 1 page.

* cited by examiner

*Primary Examiner* — Matthew Ing
(74) *Attorney, Agent, or Firm* — Patent Capital Group

(57) ABSTRACT

An apparatus in one example embodiment includes a tabletop, a support member coupled to the tabletop, and a base coupled to the support member. The base is axially spaced from the tabletop and configured to be received in a planter. In further embodiments, at least a portion of the base is spaced from a floor of the planter when the base is received in the planter. In yet further embodiments, a plurality of feet are coupled to the base and extend below the base. At least one of the feet may be adjustable to alter a vertical spacing between a head of the foot and the base. In some embodiments, one or more drainage holes may be formed in the base. In other embodiments, the apparatus includes one or more other support members, each coupled to the base and the tabletop.

20 Claims, 10 Drawing Sheets

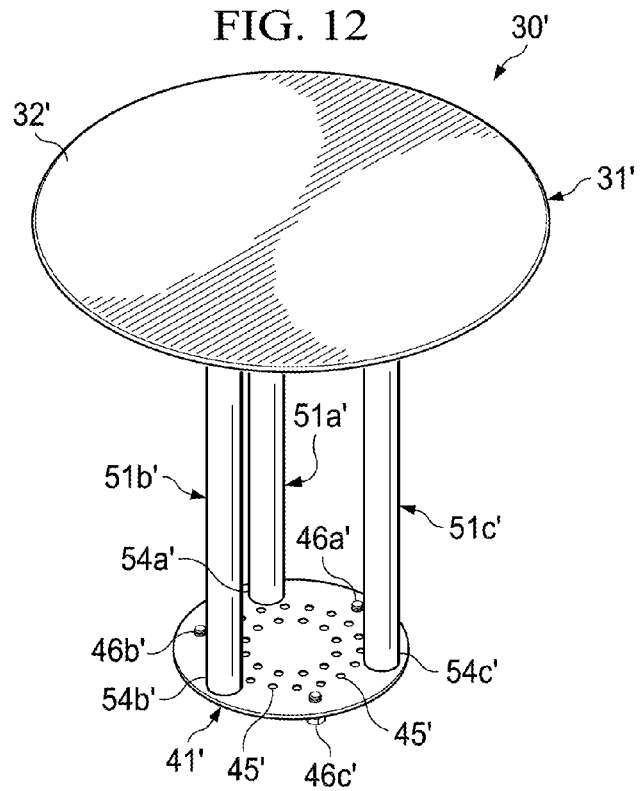
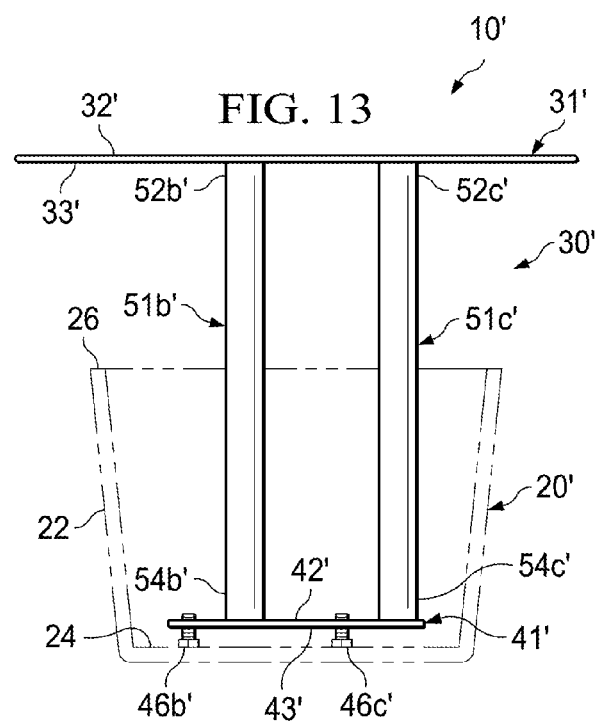

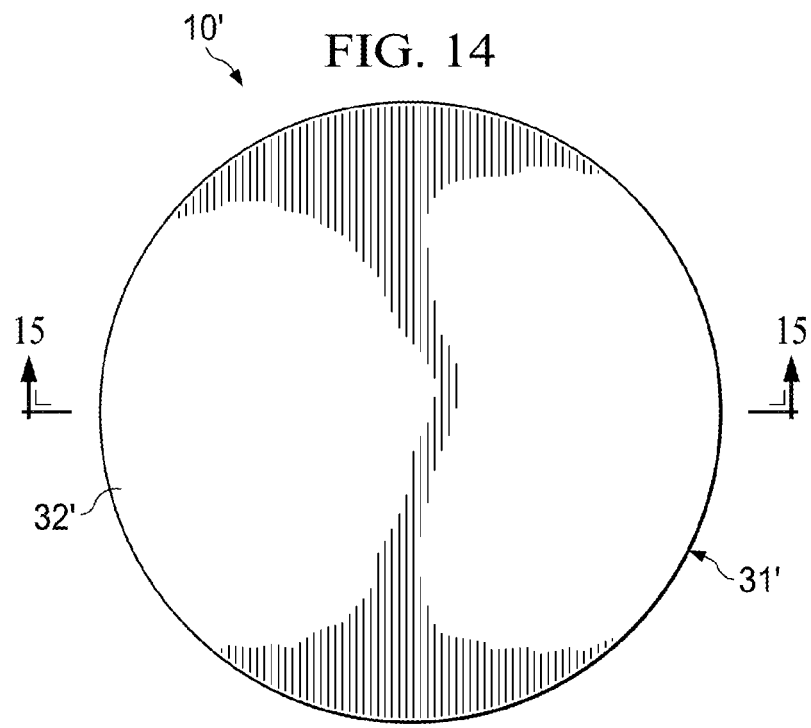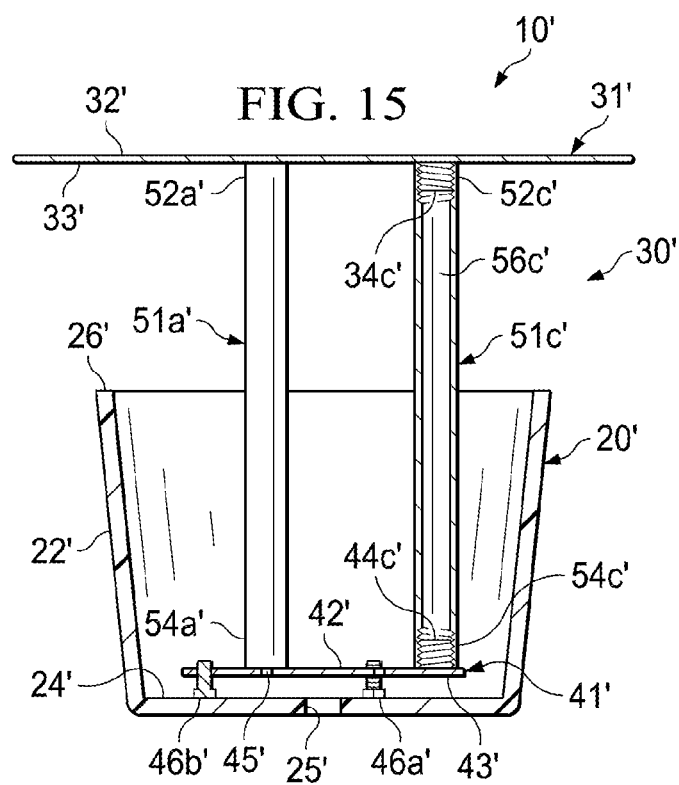

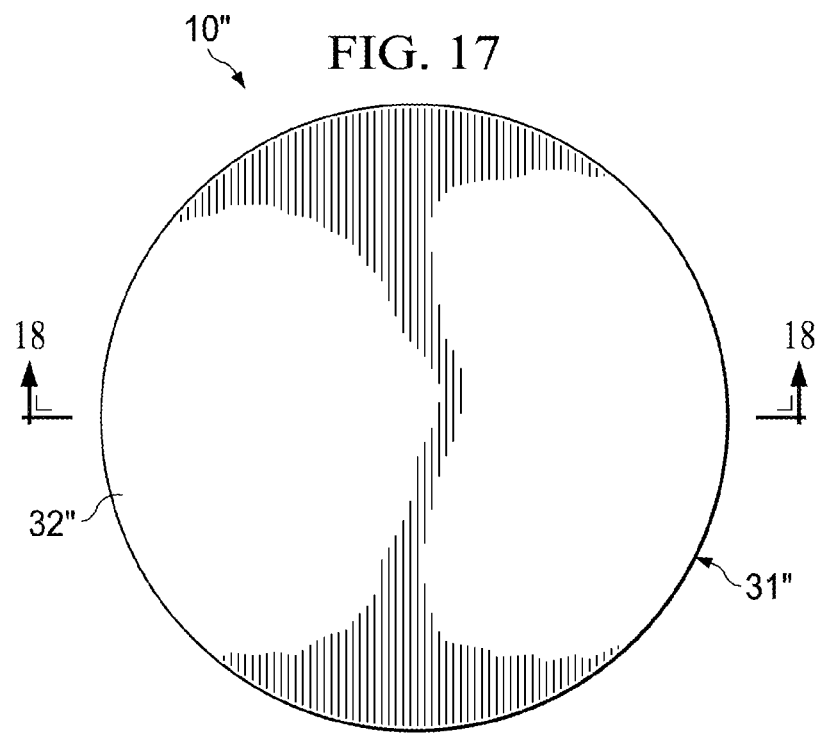
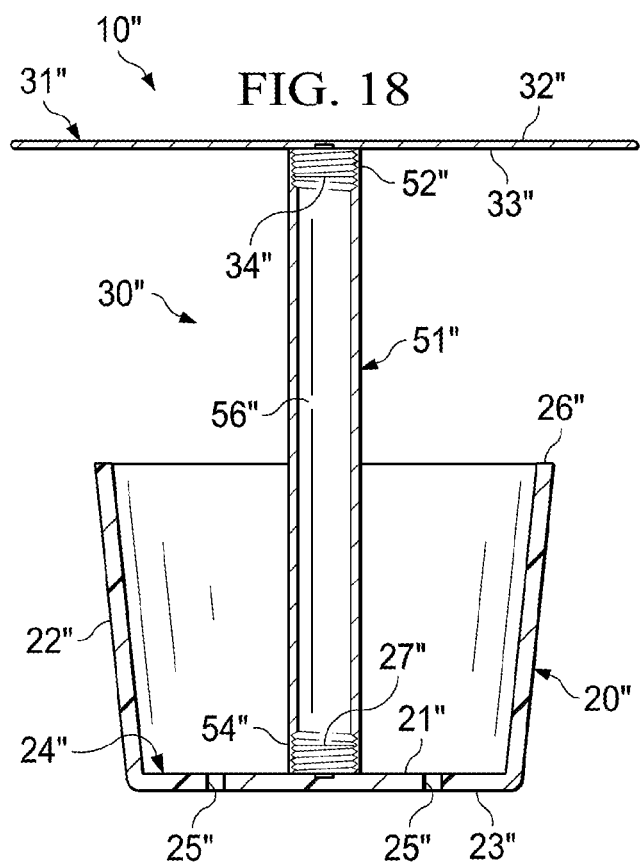

PLANTER TABLE SYSTEM

TECHNICAL FIELD

This disclosure relates in general to furniture and, more particularly, to a planter table system.

BACKGROUND

In recent years, outdoor living areas have soared in popularity. Outdoor living areas are often designed with various features to create an inviting area for entertaining, spending time with family and friends, or simply relaxing outside. Numerous options are available for creating desirable outdoor living areas including, for example, gazebos, outdoor kitchens, stone fireplaces, fire pits, patios, decks, water features, landscaping, container gardening, and outdoor furniture (e.g., tables, chairs, benches, bars, etc.). In spite of the many different options available, the features selected for a particular space may be constrained by the size of the particular space and/or the financial resources of the owner. In particular, in condominiums, townhomes, apartments, and even many single-family homes on small lots, the outdoor area that can be furnished and decorated is often unable to accommodate many of the available options.

The popularity of outdoor living areas stems, at least in part, from the ambiance created from being surrounded by nature. Accordingly, it is often desirable to decorate an indoor living area with aesthetically pleasing plants to provide a similar atmosphere indoors. Decorating indoor areas with plants, however, is often limited by the amount of indoor space available for non-functional or decorative items. Therefore, additional options are needed for creating desirable indoor and outdoor living areas.

BRIEF DESCRIPTION OF THE DRAWINGS

To provide a more complete understanding of the present disclosure and features and advantages thereof, reference is made to the following description, taken in conjunction with accompanying figures, where like reference numerals represent like parts, in which:

FIG. 12 is a top and side perspective view of another example embodiment of a table assembly for a planter table system in accordance with the present disclosure;

FIG. 13 is a side elevation view of another embodiment of a planter table system with the table assembly of FIG. 12 and a planter shown in phantom;

FIG. 14 is a top plan view of the planter table system of FIG. 13;

FIG. 15 is a cross-sectional view of the planter table system taken along lines 15-15 of FIG. 14;

FIG. 17 is a top plan view of the planter table system of FIG. 16; and

FIG. 18 is a cross-sectional view of the planter table system taken along lines 18-18 of FIG. 17.

DESCRIPTION OF EXAMPLE EMBODIMENTS

Overview

Figure 1:
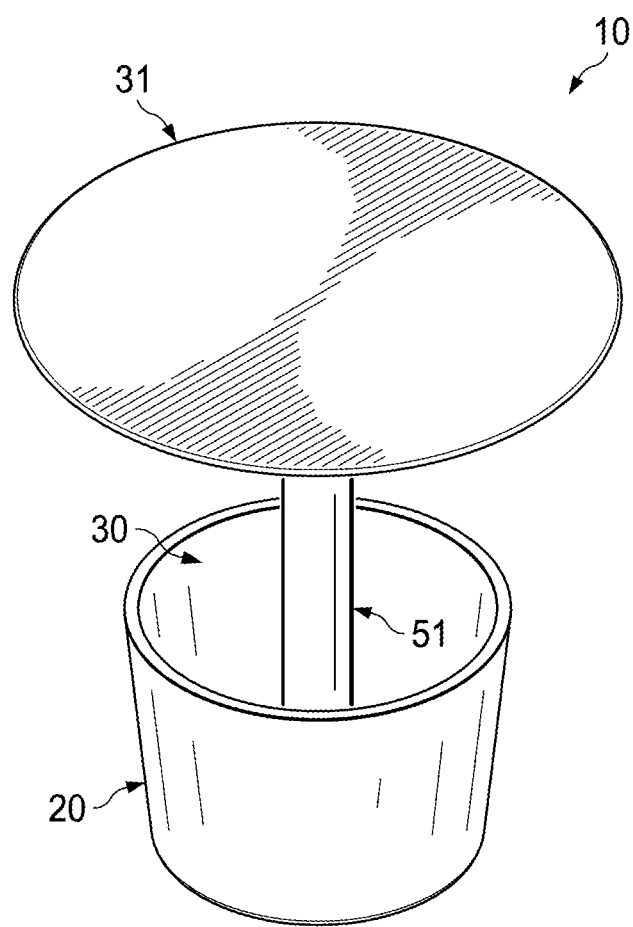
FIG. 1 is a top and side perspective view of a planter table system in accordance with one embodiment of the present disclosure.
Figure 2:
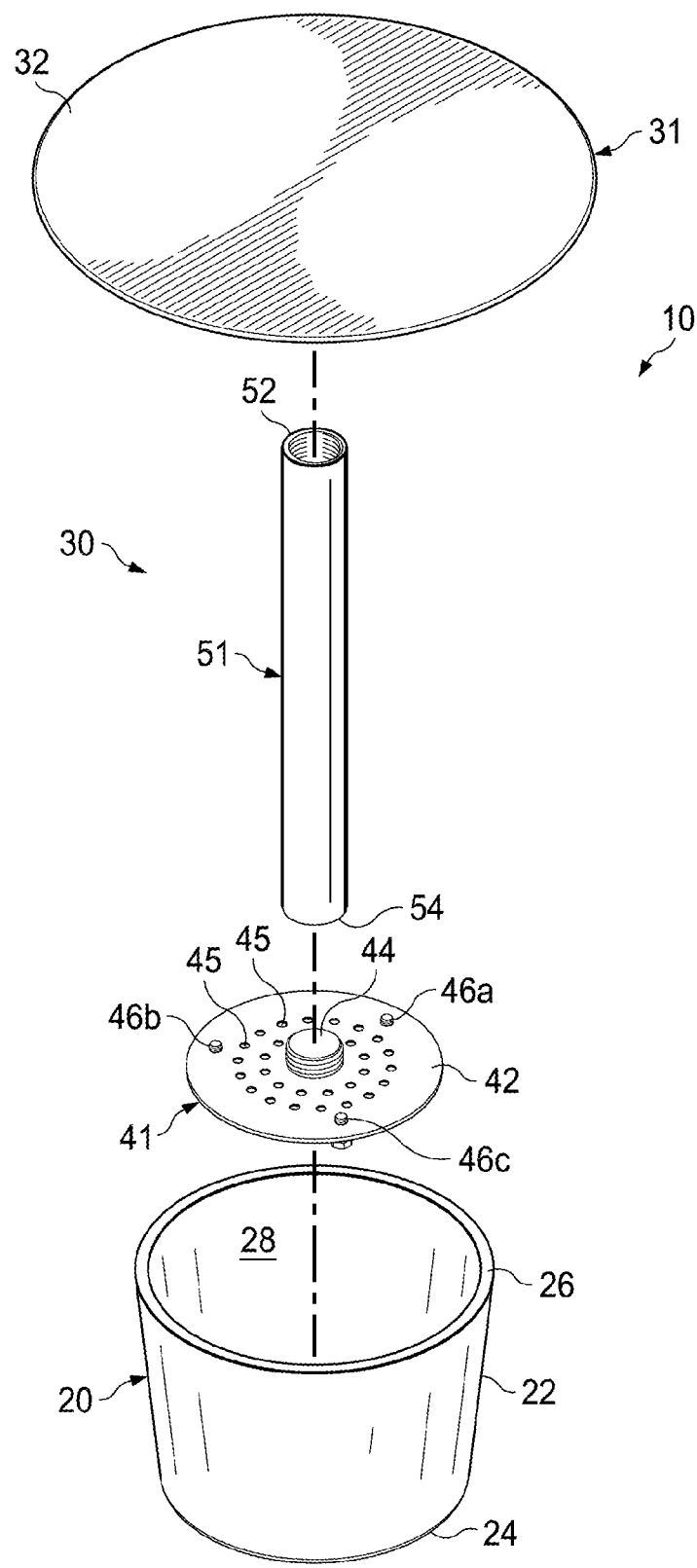
FIG. 2 is a top and side exploded view of the planter table system of FIG. 1, including a table assembly and a planter in accordance with an embodiment of the present disclosure.
Figure 3:
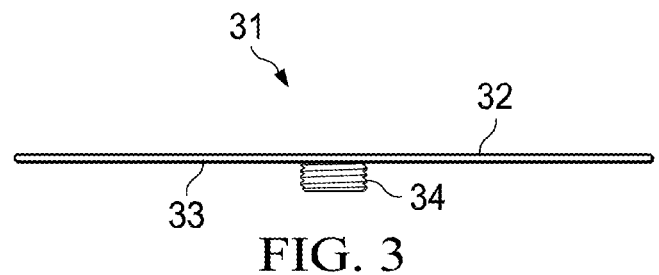
FIG. 3 is a side elevation view of a tabletop of the planter table system of FIG. 2.
Figure 4:
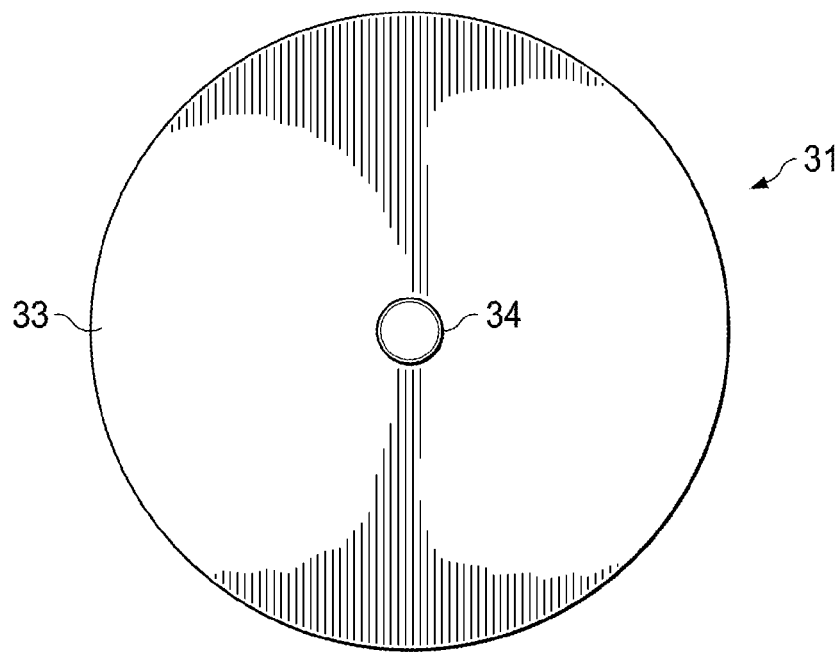
FIG. 4 is a bottom plan view of the tabletop of the planter table system of FIG. 2.
Figure 5:
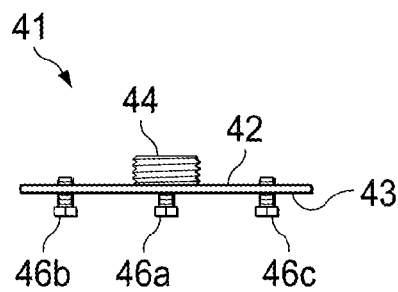
FIG. 5 is a side elevation view of a base of the planter table system of FIG. 2.
Figure 6:
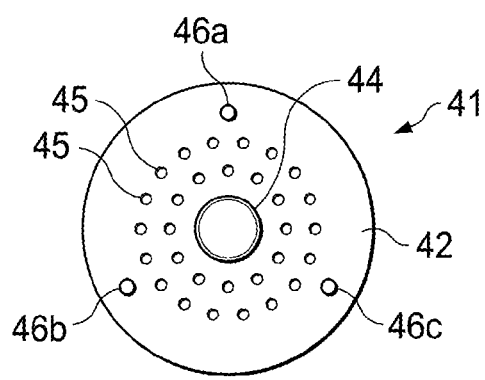
FIG. 6 is a top plan view of the base of the planter table system of FIG. 2.
Figure 7:
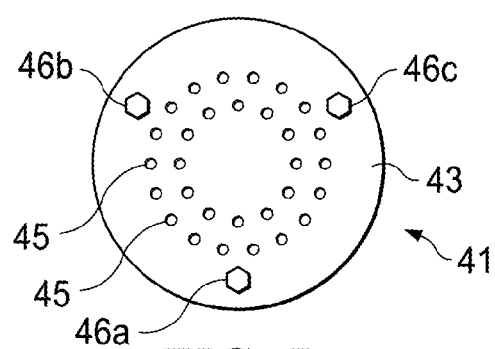
FIG. 7 is a bottom plan view of the base of the planter table system of FIG. 2.
Figure 8:
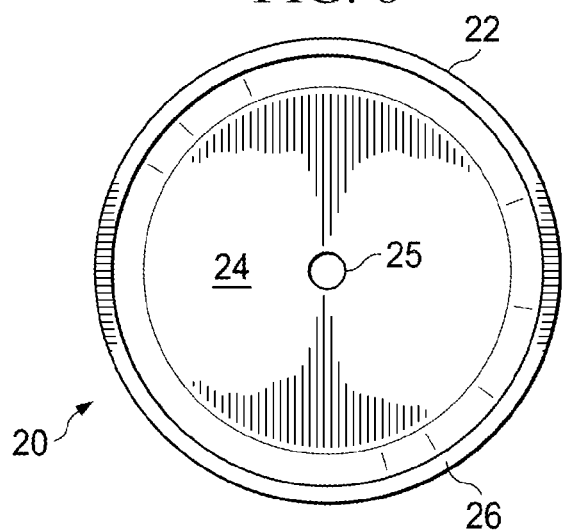
FIG. 8 is a top plan view of the planter of the planter table system of FIG. 2.
Figure 9:
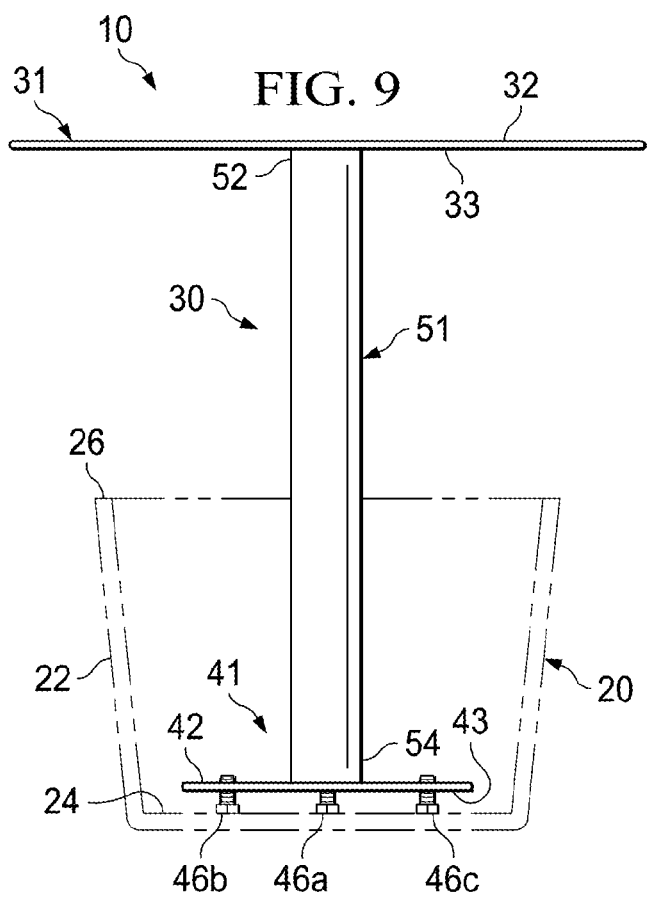
FIG. 9 is a side elevation view of the planter table system of FIG. 2 with the planter shown in phantom.
Figure 10:
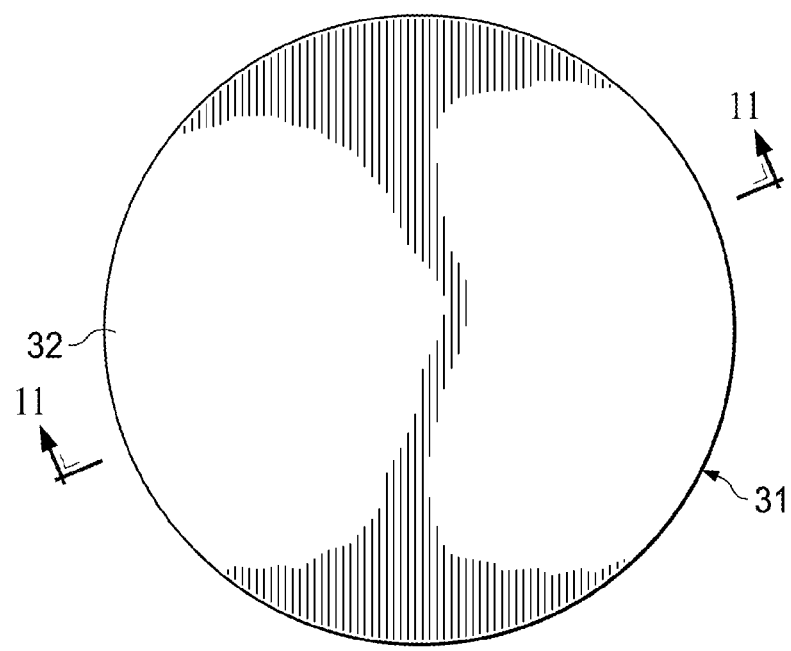
FIG. 10 is a top plan view of the planter table system of FIG. 2.
Figure 11:
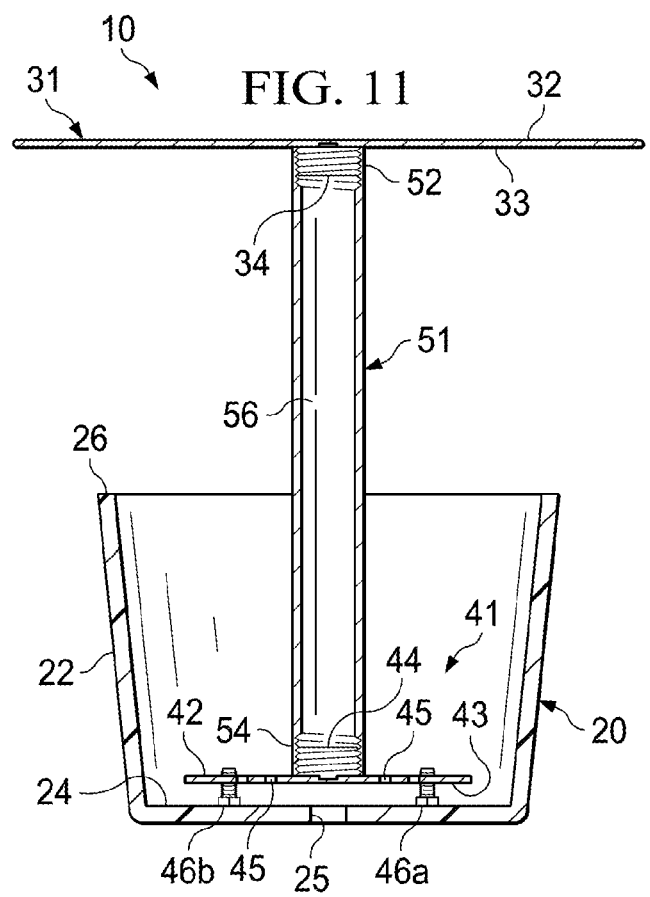
FIG. 11 is a cross-sectional view of the planter table system taken along lines 11-11 of FIG. 10.

An apparatus is provided in one example embodiment and includes a tabletop, a support member coupled to the tabletop, and a base coupled to the support member. The base is axially spaced from the tabletop and configured to be received in a planter. In further embodiments, at least a portion of the base is spaced from a floor of the planter when the base is received in the planter. In yet further embodiments, the apparatus includes a plurality of feet coupled to the base and extending below the base. At least one of the feet may be adjustable to alter a vertical spacing between a head of the foot and the base. In some embodiments, one or more drainage holes are formed in the base. In more specific embodiments, the apparatus includes one or more other support members, each coupled to the base and the tabletop. Additionally, the tabletop can be configured to allow at least some light to traverse the tabletop.

A table system is provided in another example embodiment and includes a base with a receiving member and a wall surrounding the base. The table system also includes a support member coupled to the receiving member of the base. The table system further includes a tabletop coupled to the support member and axially spaced from an upper edge of the wall. In specific embodiments, the wall is joined to the base and extends upwardly from the base, defining a receiving cavity therein. In more specific embodiments, the tabletop and the base are in axial alignment and the support member is coupled to the receiving member of the base at an axial center of the base.

A method is provided in one example embodiment and includes securing a lower end of a support member to a first receiving member of a base, securing an upper end of the support member to a second receiving member of a tabletop, and positioning the base in a planter. The tabletop and the base are axially spaced apart by the support member. Additionally, a bottom surface of the base opposes a floor of the planter and a wall is joined to the floor and extends upwardly from the floor. In further embodiments, the method includes adjusting at least one foot of three or more feet of the base to stabilize the base on the floor of the planter. Each of the feet extends below the base and contacts the floor of the planter.

Example Embodiments

With reference now to the FIGURES, embodiments of a new planter table system, generally designated by reference numerals 10 and 10', will be described. Where alternative embodiments are shown, common elements are similarly numbered and not separately described, with the addition of apostrophes to distinguish the embodiments.

FIG. 1 is a top and side perspective view of one example embodiment of a planter table system 10, which may be used to provide a functional table with aesthetically-pleasing qualities of one or more plants. Planter table system 10 includes a planter 20 and a table assembly 30 supported within the planter. Table assembly 30 includes a tabletop 31 and a support member 51 that holds tabletop 31 at a sufficient height above planter 20 to allow one or more plants to grow in the area defined between planter 20 and tabletop 31.

For purposes of teaching and discussion, it is important to understand the environment in which planter table system 10 may be used. The following foundational information may be viewed as a basis from which the present disclosure may be properly explained. Such information is offered for purposes of explanation only and, accordingly, should not be construed in any way to limit the broad scope of the present disclosure and its potential applications and embodiments.

Indoor and outdoor living areas are often furnished with tables and chairs and decorated with potted plants to create a useful space with a desired ambiance. In particular, large planters have become a staple for creating a dramatic visual effect with one or more plants. Such planters can enhance the ambiance and generally create a more inviting area for entertaining, dining, or relaxing.

Large planters, suitable for placement on a floor or ground area, are also frequently used in the hobby of container gardening, which is the practice of growing plants in containers rather than planting them in the ground. Container gardening is typically used for ornamental purposes, for areas where the soil or climate is unsuitable for a particular plant, for houseplants, and for areas where the outdoor growing space is limited or nonexistent. Container gardening is particularly useful for an individual who lives in a residence having little or no outdoor area for regular gardening.

In many indoor and outdoor spaces, the desire to have both the beauty of plants and the functionality of human furnishings, such as a table, can be difficult to achieve. For individuals living in a residence with a small outdoor area (e.g., condominiums, townhomes, apartments, etc.), a limited amount of furnishings and/or potted plants may be used simply due to space constraints. Similarly, decorating indoor areas with potted plants or engaging in other indoor container gardening may be limited by the indoor space available for such items. The space required for a planter is dependent upon the size of the particular container and, in some instances, the plant or plants growing in the container. Consequently, the use of a large planter that takes up a significant amount of precious floor or ground space may be sacrificed if the functionality of a table is also desired. In other scenarios, even large indoor and outdoor areas may have certain spaces that are not sufficiently sized to accommodate both a large planter and a table. Thus, a choice is often made to forgo either the functionality of a table or the enhanced ambiance and enjoyment created by plants in a large floor planter.

In some instances, smaller plants may be placed on top of a table in an attempt to provide the functionality of a table and the aesthetic qualities of a plant. A planter sized for a tabletop, however, may not allow a desired plant or combination of plants to be displayed, which could otherwise be provided in a larger floor planter. Furthermore, the table's usefulness may be diminished as a portion of its tabletop surface is covered by the planter. Accordingly, new options are needed to merge the functionality of a table with the aesthetically pleasing qualities provided by container gardening, without sacrificing the usefulness of the table.

Embodiments of a planter table system as shown in FIGS. 1-18 overcome many of these problems and provide a solution for creating an aesthetically pleasing and functional indoor or outdoor living area in a limited amount of space. The unique design of the embodiments of the planter table system disclosed herein merges the functionality of a table and aesthetic qualities of one or more plants in a large floor planter. The planter table system includes a planter and a table assembly. In an example embodiment, a lower portion of the table assembly is inserted into the planter and one or more plants can be planted in the planter over and around the lower portion of the table assembly. A tabletop of the table assembly can be suitable for drinks or other items and can act as an accent table or end table, for example. Furthermore, the tabletop can be configured to permit light and air to reach the one or more plants in planter 20. Additionally, certain embodiments provide a clear support member that enables ornamental customization of the planter table system, thereby potentially further enhancing its aesthetic features. Although the planter table system could be placed in any desired location, it is particularly suited for use in small spaces (e.g., small outdoor patio, balcony, area for an end table, etc.).

Referring now to FIGS. 1-11, an example embodiment of planter table system 10, which includes planter 20 and table assembly 30, is illustrated. As shown in the exploded view of planter table system 10 in FIG. 2 (and/or others), table assembly 30 includes tabletop 31, support member 51, a base 41, an upper receiving member 34, a lower receiving member 44, and a plurality of feet 46a, 46b, and 46c. Tabletop 31, shown in FIGS. 1-4 and 9-11, includes a top surface 32 and a bottom surface 33. Although tabletop 31 could be configured in any desirable shape (e.g., circular, oval, rectangular, square, etc.), the example shown herein is circular.

Upper receiving member 34 may be formed in a threaded male configuration (shown in FIGS. 3, 4, and 11) and extend axially downward from bottom surface 33 of tabletop 31. In the embodiment shown in FIGS. 1-11, upper receiving member 34 may be positioned at an axial center of tabletop 31. In other embodiments configured with more than one support member, however, upper receiving members may also or alternatively be provided in other areas of bottom surface 33 of tabletop 31. In some embodiments, upper receiving member 34 may be integrally formed with tabletop 31. In other embodiments, upper receiving member 34 may be affixed to tabletop 31 using any other suitable technique (e.g., gluing, welding, mechanical connection, etc.).

Base 41 of table assembly 30, shown in FIGS. 2, 5-7, 9 and 11, includes an upper surface 42 and a lower surface 43. Base 41 could be configured in any suitable shape (e.g., circular, rectangular, square, oval, etc.), that provides stability for tabletop 31 and that fits within a receiving cavity 28 of planter 20 to be positioned proximate a floor 24 of planter 20. The example embodiment of base 41 shown herein is circular.

Lower receiving member 44 may be formed in a threaded male configuration (shown in FIGS. 2, 5, 6 and 11) and extend axially upward from upper surface 42 of base 41. In the embodiment shown in FIGS. 1-11, lower receiving member 44 may be positioned at an axial center of base 41. In other embodiments configured with more than one support member, however, lower receiving members may also or alternatively be provided in other areas of upper surface 42 of base 41. In some embodiments, lower receiving member 44 may be integrally formed with base 41. In other embodiments, lower receiving member 44 may be affixed to base 41 using any other suitable technique (e.g., gluing, welding, mechanical connection, etc.).

Base 41 may also include drainage holes to enable water to drain when base 41 is inserted in planter 20 with soil and one or more plants covering it. Any suitable number and size of drainage holes may be provided in base 41. A few representative holes are indicated in FIGS. 2, 6, 7, and 11 by reference number 45. In the example embodiment shown in these FIGURES, thirty holes are formed in two concentric circles in base 41. In other embodiments, drainage holes may not be formed in base 41. Accordingly, water may drain off the periphery of base 41.

Base 41 may also include three or more foot holes for receiving feet 46a, 46b, and 46c, shown in FIGS. 2, 5-7, 9 and 11. Feet 46a-c can extend through the foot holes of base 41 and downwardly from bottom surface 43, such that feet 46a-c are vertically oriented when table assembly is placed in planter 20. Feet 46a-c may be configured to create a spacing between bottom surface 43 of base 41 and floor 24 of planter 20, which may facilitate water drainage from planter 20. In one example embodiment, each of the feet 46-c can be configured as a screw with a threaded portion and a blunt head. The threaded portion of each foot can extend through one of the foot holes in base 41, with the head of each foot positioned below bottom surface 43 of base 41 to contact floor 24 of planter 20. The foot holes in base 41 that receive the threaded portions of feet 46a-c may be sized with complementary threads to allow feet 46a-c to be vertically adjusted by turning. Thus, one or more of the heads of feet 46a-c may be moved up and/or down relative to base 41, as needed, to ensure each head of feet 46a-c contacts floor 24, thereby stabilizing table assembly 30 within planter 20. Although three feet 46a-c are illustrated in the FIGURES, any suitable number of feet may be used. For example, a table assembly configured with a rectangular or square base, may have four feet, with each foot proximate a different corner of the base.

Support member 51, shown in FIGS. 1, 2, 9, and 11, may be configured as a longitudinal post in any suitable shape (e.g., cylinder, rectangular prism, triangular prism, etc.), having an upper end 52 and a lower end 54. As shown herein by way of example, support member 51 is cylindrical in shape and defines a hollow interior 56. Support member 51 may be coupled to tabletop 31 and base 41 using any suitable technique including, for example, mated pairs of connectors. As shown in the FIGURES, upper end 52 of support 51 can be formed in a threaded female configuration and coupled to upper receiving member 34. Similarly, lower end 54 of support 51 can be formed in a threaded female configuration and coupled to lower receiving member 44. Upper receiving member 34 and lower receiving member 44 may be positioned, respectively, at axial centers of lower surface 33 of tabletop 31 and upper surface 42 of base 41, such that tabletop 31 and base 41 are vertically spaced apart and in axial alignment with each other when support member 51 is coupled to both upper and lower receiving members 34 and 44.

The mated pair of upper connectors (i.e., upper end 52 of support member 51 and upper receiving member 34) and the mated pair of lower connectors (i.e., lower end 54 of support member 51 and lower receiving member 44) permit simple and easy assembly and disassembly of table assembly 30. Although the FIGURES herein illustrate support member 51 configured with threaded female ends 52 and 54, one or both of these ends could be configured as threaded male ends, and the respective receiving members 34 and/or 44 could be configured as complementary threaded female receiving members. Furthermore, in alternative embodiments, support member 51 could be coupled to tabletop 31 and base 41 via any other suitable coupling mechanism (e.g., snap-fit couplings, sleeve couplings, push fit couplings, etc.). Moreover, the coupling mechanism between support 51 and tabletop 31 may be the same or different than the coupling mechanism between support 51 and base 41.

In example embodiments, tabletop 31 can be made of a clear material to allow light to traverse (i.e., pass through) the tabletop to one or more plants that may be growing in planter 20 and to provide greater visibility of the plants. In some embodiments, for example, tabletop 31 can be made from acrylic (e.g., polymethyl methacrylate (PMMA)) or tempered glass. Alternatively, tabletop 31 can be made from another suitable material such as aluminum. When tabletop 31 is made from a solid material such as aluminum, its design could be a pattern that allows light to filter through the tabletop (e.g., crisscross pattern, loose basket weave pattern, etc.) to plants in planter 20. Alternatively, tabletop 31 could be designed with a material and pattern (or no pattern) such that sunlight cannot penetrate it. This embodiment may be desirable for plants that thrive in indirect sunlight or shade.

Upper receiving member 34 may be configured from the same material as tabletop 31 and joined to tabletop 31 using any suitable techniques. In some embodiments, upper receiving member 34 may be integrally formed with tabletop 31. For instance, an acrylic upper receiving member may be integrally formed with an acrylic tabletop using an acrylic die casting manufacturing process. Similarly, a metal receiving member may be integrally formed with a metal tabletop using a metal die casting manufacturing process. In other embodiments, tabletop 31 and upper receiving member 34 may be separately manufactured (e.g., tabletop 31 may be cut from preformed sheets of acrylic, upper receiving member 34 may be produced from preformed acrylic tubes or from acrylic die casting, etc.). Consequently, upper receiving member 34 could be affixed to tabletop 31 by gluing, welding, mechanical connectors, etc. In one example implementation, an acrylic receiving member may be glued to an acrylic tabletop using an acetone-based adhesive. In yet another example, a metal (e.g., aluminum) receiving member may be welded to a metal (e.g., aluminum) tabletop.

Base 41 can be made of a metal such as aluminum, or of any other suitable material such as acrylic. Lower receiving member 44 may be configured from the same material as base 41. As previously described with reference to upper receiving member 34 and tabletop 31, lower receiving member 44 may be integrally formed with base 41 (e.g., using die casting manufacturing processes) or otherwise affixed to base 41 using any suitable techniques (e.g., gluing, welding, mechanical connectors, etc.). Additionally, feet 46a-c could be made from any rust-proof or rust-resistant material that is capable of supporting the weight of table assembly 30. In one possible implementation, stainless steel coated with galvanized zinc or nickel could be used.

Various materials and manufacturing processes may be employed to manufacture the components of table assembly 30. The individual components for a particular table assembly may be manufactured using the same or different processes, and may be made from the same or different materials. By way of illustration, one example table assembly could include some acrylic pieces (e.g., tabletop 31, upper receiving member 34, support member 51), some aluminum pieces (e.g., base 41 and lower receiving member 44), and some coated steel pieces (e.g., feet 46a-c). It will be apparent that numerous combinations of materials and/or manufacturing processes may be used to create a table assembly as shown and described herein. Moreover, any number of possible coupling mechanisms may be used to couple support 51 to tabletop 31 and base 41. Accordingly, the material combinations and coupling mechanisms described herein are intended for illustrative purposes only and are not intended to be limiting. It will be apparent that numerous substitutions, combinations, and variations of materials and of coupling mechanisms may be utilized in any of the embodiments of a table assembly described herein.

Support member 51 can also be manufactured from a clear material such as acrylic or tempered glass, or from other suitable materials such as cast aluminum. The use of a clear material for support member 51 may be desirable for some embodiments. First, the clear material allows light to traverse (i.e., pass through) the support member and be received by plants in planter 20. Second, the clear material allows more visibility of the plants in planter 20, thereby enhancing the aesthetic qualities of planter table system 10. Finally, a clear, hollow support member 51 enables ornamental customization of planter table system 10. For example, any suitable ornamental items (e.g., rocks, colored pebbles, potpourri, beads, shells, marbles, etc.), or combination of ornamental items, may be used to fill hollow interior 56 of support member 51. Thus, planter table system 10 can be customized to suit an individual's particular tastes and create a unique and functional planter table system.

Other customizations can include string lights (e.g., Christmas tree-type string lights) or rope lights inserted, alone or in combination with other ornamental items, into hollow interior 56 of support member 51 to create a light element for planter table system 10. In one example implementation, an opening may be defined in support member 51 near lower end 54, through which a cord of the lights can pass. In another example, an opening may be formed through lower receiving member 44 and base 41, aligned with hollow interior 56 of support member 51, through which the cord could pass. An opening may also be provided in wall 22 of planter 20 through which the cord could exit planter 20 to access an electrical outlet.

In some embodiments, support member 51 may be extendable. An extendable support member enables the height of tabletop 31 relative to an upper edge 26 of planter 20 to be adjusted. This may be desirable, for example, if a plant in planter 20 needs more space for growth. Support member 51 can be configured in any suitable manner to enable extension. For example, support member 51 could comprise two tubes, with an end of an inner tube slidably inserted into an end of an outer tube, and with an adjustable locking mechanism offering various preset positions at which the inner tube could be locked and prevented from movement relative to the outer tube. In another embodiment, one or more extensions could be coupled to support member 51 to increase the length of support member 51. For instance, embodiments having at least one mated pair of connectors as described herein, can accommodate extensions configured with a threaded female end and a threaded male end. For the particular embodiment shown in FIGS. 1-11, the threaded male end of an extension could be coupled to upper or lower end 52 or 54 of support member 51. The threaded female end of the extension could be coupled to the corresponding upper or lower receiving member 34 or 44. Additional extensions could be added for increased height.

Planter 20, shown in FIGS. 1, 2, 8, 9, and 11, includes floor 24 and at least one upwardly extending wall 22 with upper edge 26. Wall 22 may be joined with floor 24 and extend upwardly from an outer periphery of floor 24. Wall 22 and floor 24 define receiving cavity 28 in which base 41 of table assembly 30 may be positioned. Soil can be added to receiving cavity 28 to cover base 41 and surround a lower portion of support member 51. In addition, one or more plants may be planted in the soil and permitted to grow upwardly in the spacing defined between upper edge 26 of planter 20 and tabletop 31. Planter 20 may be provided with one or more drainage holes, such as drainage hole 25 shown in FIG. 8. Additionally, in some alternative embodiments, planter 20 may have additional holes in floor 24 to receive the heads of feet 46a-c, which could provide additional stability for table assembly 30. In such an embodiment, the threaded portions of feet 46a-c may be sufficiently sized to allow the heads to be received in the corresponding holes of floor 24 and to still maintain a spacing between base 41 and floor 24 of planter 20.

Planter 20 may have any number of desired shapes (e.g., cylinder, cone, cube, rectangular prism, etc.). Moreover, one or more walls of planter 20 may have a convex or concave shape, or any other shape that defines a receiving cavity sized to receive base 41 of table assembly 30. The example embodiment shown in FIGS. 1, 2, 8, 9 and 11 show planter 20 having a slightly conical shape, with a tip of the cone truncated by the generally circular floor 24 and a mouth of the cone terminated at upper edge 26.

Planter 20 may be sized to receive base 41 such that feet 46a-c contact floor 24 and base 41 is spaced from and opposes floor 24. Planter 10 could be configured to receive various shapes and sizes of base 41, as described herein. For example, for a circular, square, rectangular or oval base, the planter could have a complementary circular, square, rectangular or oval shape. Alternatively, planter 20 could be configured in another shape sized to receive the particular base configuration.

Planter 20 can be made using any appropriate material for container gardening. By way of example, planter 20 may be made from terra cotta, ceramic, durable poly-resin, fiberglass, composite concrete, or any other suitable material that can be configured to receive a table assembly (e.g., table assembly 30) and serve as a planter in accordance with this specification. In other embodiments, planter 20 may be made from other materials if receiving cavity 28 of planter 20 is not intended for use as a planter for live plants.

Planter table system 10 can be configured in various sizes, using any suitable dimensions in accordance with the present disclosure. In one example configuration, tabletop 31 can be configured to have a height from the floor or ground of approximately 18-24 inches. Base 41 can vary in size and tabletop 31 may be sized to be larger than, but in proportion to base 41 to ensure stability. By way of example, a small table assembly 30 could have a base sized between 10-12 inches in diameter (or length), a medium table assembly 30 could have a base sized between 14-16 inches in diameter (or length), and a large table assembly 30 could have a base sized between 16-18 inches in diameter (or length). Floor 24 of planter 20 could be sized to correspond to a particular base, or to be somewhat larger than the particular base.

As illustrated in the various embodiments herein, a tabletop of a table assembly could be configured to have a shape that corresponds to the shape of the base of the table assembly, and a size that is larger than, but in proportion to, the base. Nevertheless, it will be apparent that a tabletop could be configured in any size and shape for which a base and one or more support members can provide sufficient stability when inserted in a planter.

Planter table system 10 may be assembled and disassembled in various ways. In one possible scenario, upper end 52 of support member 51 is first attached to upper receiving member 34 (e.g. by rotating support member 51). Next, lower end 54 of support member 51 is attached to lower receiving member 44 (e.g., by rotating base 41 and thereby rotating lower receiving member 44). Base 41 of table assembly 30 may then be inserted in receiving cavity 28 of planter 20. If base 41 is not level on floor 24 of planter 20, table assembly 30 may be removed and one or more feet 46a, 46b, and/or 46c may be adjusted up and/or down relative to base 41. Table assembly 30 may again be inserted into receiving cavity 28 of planter 20. The steps of inserting table assembly 30 into receiving cavity 28, removing table assembly 30 from receiving cavity 28, and adjusting one or more feet 46a-46c of table assembly 30, may be performed multiple times until base 41 is level on floor 24 of planter 20. Next, soil may be added to receiving cavity 28 to cover base 41 and surround the lower portion of support 51. One or more plants may be planted in the soil in planter 20.

To disassemble planter table system 10, the soil and plants may be removed from planter 20, and table assembly 30 may be removed from planter 20. Next, tabletop 31 may be detached from support 51 (e.g., by rotating tabletop 31). Any decorative items in the hollow interior 56 of support member 51 may be removed from support member 51. Base 41 may then be detached from support member 51 (e.g., by rotating support member 51). Any of these steps may be altered, deleted or modified as deemed appropriate.

Turning to FIGS. 12-15, an alternative embodiment of a planter table system is illustrated. Like planter table system 10 of FIGS. 1-11, an alternative planter table system 10' can include a table assembly 30' and a planter 20'. Planter 20' can include a floor 24' and an upwardly extending wall 22', joined to floor 24' and terminating at an upper edge 26'. Wall 22' and floor 24' define a receiving cavity in which base 41' of table assembly 30' may be positioned. Table assembly 30' includes a tabletop 31', a base 41', and a plurality of feet 46a'-46c'. Tabletop 31' can have an upper surface 32' and a lower surface 33'. Base 41' can have an upper surface 42' and a lower surface 43', and can define a plurality of drainage holes 45' therein.

Table assembly 30' of FIGS. 12-15 may also include multiple support members 51a', 51b', and 51c', having respective upper ends 52a', 52b', and 52c', and respective lower ends 54a', 54b', and 54c'. Accordingly, multiple upper receiving members 34a' (not shown), 34b' (not shown), and 34c' may be provided for securing respective upper ends 52a', 52b', and 52c' of support members 51a', 51b', and 51c' to tabletop 31'. Similarly, multiple lower receiving members 44a' (not shown), 44b' (not shown), and 44c' may be provided for securing respective lower ends 54a', 54b', and 54c' of support members 51a', 51b', and 51c' to base 41'. In one example embodiment, lower receiving members 44a', 44b', and 44c' can be evenly spaced around an outer edge of upper surface 42' of base 41'. Accordingly, upper receiving members 34a', 34b', and 34c' may be positioned in the same evenly spaced arrangement on lower surface 33' of tabletop 31' to enable corresponding support members 51a', 51b', and 51c' to provide vertical support between tabletop 31' and base 41'.

Generally, support members 51a'-51c' and the corresponding upper receiving members 34a'-34c' and lower receiving members 44a'-44c' may be configured as described with reference to embodiments of support member 51 in FIGS. 1-11. To enable assembly and disassembly of multiple support members 51a'-51c', however, either the upper receiving members 34a'-34c', the lower receiving members 44a'-44c', or both, may be configured such that the receiving members themselves can be rotated relative to the surfaces of the particular tabletop 31' or base 41' to which they are joined. In a mated pair configuration, for example, each of the lower receiving members 44a', 44b', and 44c' could be configured to extend through a threaded hole in base 41' so that the lower receiving members could be rotated from below base 41' to mate with lower ends 54a', 54b', and 54c' of support members 51a', 51b', and 51c', respectively.

In another embodiment, either the upper pairs of connectors (i.e., upper receiving members 34a'-34c' and upper ends 52a'-52c' of support members 51a'-51c'), the lower pairs of connectors (i.e., lower receiving members 44a'-44c' and lower ends 54a'-54c' of support members 51a'-51c'), or both may be configured such that no rotation is needed for coupling the connector pairs. Example coupling mechanisms could include push fit couplings, snap fit couplings, or any other suitable, non-rotating, coupling technique.

Although planter table system 10' illustrates an embodiment with three supports 51a', 51b', and 51c' forming generally an equilateral triangle, it will be apparent that table assembly 30' could be configured with any number of multiple supports appropriately spaced to support a tabletop. For example, a base of a table assembly could be configured in a rectangular or oval shape. In one configuration, two support members could be provided, with a single support member proximate each end of the base. In another embodiment, four support members could be provided, with two support members proximate each end. In yet other embodiments, any number of additional support members could be used along with a support member positioned at a center point (e.g., an axial center) of the base and tabletop. Thus, it will be apparent that any number and arrangement of support members may be used in accordance with this specification.

Figure 16:
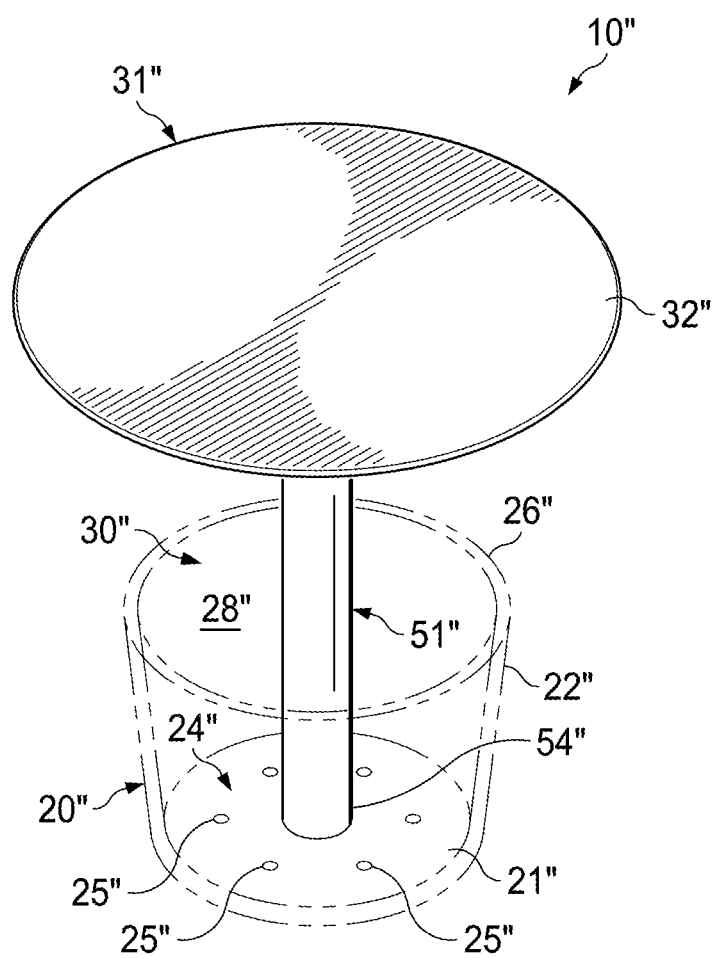
FIG. 16 is a top and side perspective view of another example embodiment of a planter table system in accordance with the present disclosure.

Turning to FIGS. 16-18, an alternative embodiment of a planter table system is illustrated. Like planter table system 10 of FIGS. 1-11, an alternative planter table system 10" can include a table assembly 30" and a planter 20". Planter 20" can include a floor 24" and an upwardly extending wall 22", joined to floor 24" and terminating at an upper edge 26". Wall 22" and floor 24" define a receiving cavity 28" in which a lower portion of table assembly 30" may be positioned and secured. Table assembly 30" can include a tabletop 31" and a support member 51", but may not have a base that is separate from planter 20". Tabletop 31" can have an upper surface 32" and a lower surface 33".

In this example embodiment, floor 24" of planter 20" may serve as a base for table assembly 30", and can have an upper surface 21" and a lower surface 23". A lower receiving member 27" may be generally configured as described with reference to lower receiving member 44 in FIGS. 1-11. Lower receiving member 27" may be integrally formed with floor 24" or otherwise suitably affixed to floor 24", in the same or similar manner as described with reference to receiving member 44 being integrally formed with or otherwise suitably affixed to base 41. Additionally, one or more drainage holes 25" may be formed in floor 24" to allow water to drain from planter 20". Drainage holes 25" may be spaced around a center of floor 24", if lower receiving member 27" is centrally positioned on floor 24", as shown in FIGS. 16 and 18.

In the example embodiment of FIGS. 16-18, support member 51" is centrally aligned with tabletop 31" and floor 24" of planter 20". Support member 51" has an upper end 52" and a lower end 54". Receiving member 34" can be configured to secure upper end 52" of support member 51" to tabletop 31". Receiving member 27" can be configured to secure lower end 54" of support member 51" to planter 20". Generally, support member 51" and corresponding upper receiving member 34" and lower receiving member 27" may be configured as described with reference to embodiments of support member 51, upper receiving member 34, and lower receiving member 44 in FIGS. 1-11, or any other suitable coupling mechanism, such as those referenced herein.

Although planter table system 10" illustrates an embodiment with a single, center support member 51", it will be apparent that table assembly 30" could be configured with any number of multiple support members appropriately spaced to support tabletop 31" within planter 20". Additionally, corresponding multiple upper and lower receiving members may be configured and affixed to tabletop 31" and floor 24"' to secure the multiple support members. Similar embodiments have been described herein and, in particular, with reference to FIGS. 12-15. Additionally, floor 24" of planter 20" could be configured in any number of desired shapes such as a rectangle, a square, or an oval shape, for example.

In another embodiment of a planter table system, multiple upper and lower receiving members of a tabletop could be sufficiently spaced such that for each upper receiving member joined to the tabletop, a separate support, base, and planter could be used to stabilize the table assembly and provide an aesthetically pleasing and functional planter table system. Thus, multiple planters (e.g., planter 20, planter 20') could be used for a single tabletop, and separate bases and one or more support members could be received in each planter, in accordance with the disclosure herein. Furthermore, this embodiment could use the table assembly and planter described with reference to FIGS. 16-18 in which floor 24" of planter 20" serves as the base for table assembly 30".

Some uses of the embodiments of planter table system 10 may not necessarily include a plant with soil in planter 20. For example, other decorative items may be displayed from planter 20 and/or planter 20 may serve as a storage area for certain items (e.g., books, magazines, towels, etc.). In such embodiments, drainage holes in base 41 and/or floor 24 may not be needed. In addition, feet 46a-c may also be unnecessary. Furthermore, other embodiments disclosed herein (e.g., planter table systems 10' and 10", and others) may be similarly adaptable to uses other than plants.

Note that any of the previously discussed components could be included in a given kit to enable a planter table system to be created or to enable an existing planter to be transformed into a planter table system. A basic kit could include a planter 20 and components of table assembly 30 (e.g., tabletop 31 with upper receiving member 34, base 41 with lower receiving member 44, support member 51, and feet 46a-c). Alternatively, a basic kit could omit the planter, and include only the table assembly components, which could be used to transform any suitable existing planter into a planter table system. Furthermore, other embodiments disclosed herein (e.g., planter table systems 10' and 10") may be similarly included in a kit to enable a planter table system to be created.

Any of the components of a planter table system shown or described herein, may be manufactured based on particular specifications and/or sizes. The present disclosure contemplates considerable flexibility in such components, as any permutation, modification, or variation in size, materials, shape, form, function, and manner of operation, to any of these elements is clearly within the broad scope of the present disclosure.

It is important to note that the stages and steps in the preceding FIGURES and description illustrate only some of the possible scenarios associated with a planter table system shown or described herein. For example, the particular order of assembly and disassembly of the components of a table assembly (e.g., table assembly 30, 30', or 30") may be altered where appropriate or desired. In addition, the assembly of a planter table system (e.g., planter table system 10, 10', or 10") and planting a desired one or more plants may be performed in any appropriate order. Thus, some of these stages and/or steps may be deleted or removed where appropriate, or these stages and/or steps may be modified or changed considerably without departing from the scope of the present disclosure. Substantial flexibility is provided by the disclosed architecture in that any suitable arrangements, chronologies, and configurations may be provided without departing from the broad scope of this present disclosure.

It is also imperative to note that although the present disclosure implicates several example uses of a planter table system, this has only been done for purposes of teaching and discussion. A planter table system as shown and described herein could readily be used in virtually any manner or location where it would be beneficial and/or desirable and, accordingly, should be construed as such.

Therefore, the foregoing is considered illustrative only of the principles of the embodiments of a planter table system. Numerous other changes, substitutions, variations, alterations, and modifications may be ascertained to one skilled in the art and it is intended that the present disclosure encompass all such changes, substitutions, variations, alterations, and modifications as falling within the spirit and scope of the appended claims.

What is claimed is:

1. An apparatus, comprising:
   a tabletop;
   a support member having one end coupled to the tabletop;
   a floor coupled to an opposite end of the support member; and
   a wall surrounding the floor and extending upwardly from the floor, the wall having an upper edge axially spaced from the tabletop, wherein the wall and the floor form a receiving cavity,
   wherein a dimension defined by the upper edge of the wall is smaller than a dimension defined by an outer edge of the tabletop.

2. The apparatus of claim 1, wherein one or more drainage holes are formed in the floor.

3. The apparatus of claim 1, wherein the tabletop and the floor are in axial alignment, the support member being coupled to the floor and the tabletop at axial centers of the floor and the tabletop.

4. The apparatus of claim 1, wherein the floor includes a receiving member removably coupled to a lower end of the support member.

5. The apparatus of claim 1, wherein the tabletop includes a receiving member removably coupled to an upper end of the support member.

6. The apparatus of claim 1, further comprising:
   one or more other support members, each coupled to the floor and the tabletop.

7. The apparatus of claim 1, wherein the tabletop is configured to allow at least some light to traverse the tabletop.

8. The apparatus of claim 1, wherein the support member is extendable.

9. A table system, comprising:
   a floor;
   a wall extending upwardly from the floor, wherein the wall and the floor form a receiving cavity;
   a base sized to be removably positioned within the receiving cavity in opposing relation to the floor;
   a support member having one end coupled to the base; and
   a tabletop coupled to an opposite end of the support member, wherein the tabletop is axially spaced from an upper edge of the wall, and wherein a dimension defined by the upper edge of the wall is smaller than a dimension defined by an outer edge of the tabletop.

10. The table system of claim 9, wherein at least a portion of the base is spaced from the floor.

11. The table system of claim 10, further comprising a plurality of feet coupled to the base, wherein each of the plurality of feet includes a head extending below the base and positioned on the floor.

12. The table system of claim 11, wherein at least one foot of the plurality of feet is adjustable to alter a vertical spacing between the head of the at least one foot and the base.

13. The table system of claim 9, wherein the tabletop and the base are in axial alignment, and wherein the support member is removably coupled to a receiving member of the base at an axial center of the base.

14. The table system of claim 9, further comprising:
one or more other support members, each coupled to the base and the tabletop.

15. The table system of claim 9, wherein the tabletop is configured to allow at least some light to traverse the tabletop.

16. The table system of claim 9, wherein the support member is extendable.

17. The table system of claim 9, wherein one or more drainage holes are formed in at least one of the floor and the base.

18. A method, comprising:
securing a lower end of a support member to a lower receiving member of a base;
securing an upper end of the support member to an upper receiving member of a tabletop, wherein the tabletop and the base are axially spaced apart by the support member; and
positioning the base in a receiving cavity of a planter, wherein a bottom surface of the base opposes a floor of the planter, wherein a wall extends upwardly from the floor to form the receiving cavity in the planter, wherein the tabletop is axially spaced from an upper edge of the wall, and wherein a dimension defined by the upper edge of the wall is smaller than a dimension defined by an outer edge of the tabletop.

19. The method of claim 18, further comprising adjusting at least one foot of three or more feet of the base to stabilize the base on the floor of the planter, wherein each of the feet extends below the base and contacts the floor of the planter.

20. The method of claim 18, further comprising:
adding soil to the planter to cover the base; and
planting one or more plants in the soil in the planter.

* * * * *